(12) United States Patent
Beaver et al.

(10) Patent No.: US 11,770,409 B2
(45) Date of Patent: Sep. 26, 2023

(54) INTRUSION MANAGEMENT WITH THREAT TYPE CLUSTERING

(71) Applicant: International Business Machines Corporation, Armonk, NY (US)

(72) Inventors: William Wesley Beaver, Austin, TX (US); Oner Sufri, Frisco, TX (US); Kevin Potter, Brooklyn, NY (US); Shirley M. Han, New York, NY (US); Zachary Ryan, Queens, NY (US); Kyle Greeley, Ann Arbor, MI (US); ChunHui Y. Higgins, Raleigh, NC (US); Omar Hammami, Blaine, MN (US); Gustavo Adolfo Arismendi Camero, Katy, TX (US); Ryan West, Columbus, OH (US); Emilio Fiallos, Belleville, NJ (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 17/141,054

(22) Filed: Jan. 4, 2021

(65) Prior Publication Data
US 2022/0217177 A1 Jul. 7, 2022

(51) Int. Cl.
*H04L 29/06* (2006.01)
*H04L 9/40* (2022.01)
(Continued)

(52) U.S. Cl.
CPC .......... *H04L 63/1491* (2013.01); *G06F 18/23* (2023.01); *G06N 20/00* (2019.01); *H04L 63/1466* (2013.01)

(58) Field of Classification Search
CPC . H04L 63/1491; H04L 63/1466; G06N 20/00; G06F 18/23
See application file for complete search history.

(56) References Cited

U.S. PATENT DOCUMENTS 3,776,226 A 12/1973 Triplett et al.
7,996,475 B2 8/2011 Drako et al.
(Continued)

OTHER PUBLICATIONS

Pasquino N., et al., "Multivariate LTE Performance Assessment through an Expectation-Maximization Algorithm Approach," 2019 IEEE International Symposium on Measurements & Networking (M&N), Catania, Italy, 2019, pp. 1-5 (Year: 2019).*
(Continued)

*Primary Examiner* — Evans Desrosiers
(74) *Attorney, Agent, or Firm* — Yee & Associates, P.C.

(57) ABSTRACT

A computer-implemented method, computer system, and computer program product for threat management. A set of features used by a machine learning model is collected by the computer system to determine a threat type for an access attempt when the access attempt is detected. A cluster is determined, by the machine learning model in the computer system, for the access attempt using the set of features, wherein the machine learning model implements clustering to determine the cluster for the access attempt, and wherein the cluster for the access attempt corresponds to the threat type for the access attempt. A set of actions is performed by the machine learning model in the computer system based on the threat type determined for the access attempt.

20 Claims, 6 Drawing Sheets

(51) Int. Cl.
G06N 20/00 (2019.01)
G06F 18/23 (2023.01)

(56) References Cited

U.S. PATENT DOCUMENTS

| | | | |
|---|---|---|---|
| 9,118,702 | B2 | 8/2015 | Macaulay |
| 2010/0115040 | A1 | 5/2010 | Sargent et al. |
| 2012/0030767 | A1* | 2/2012 | Rippert, Jr. ............ G06Q 10/10 726/25 |
| 2020/0159624 | A1* | 5/2020 | Malkov .................. G06N 20/00 |
| 2021/0084063 | A1* | 3/2021 | Triantafillos ........ H04L 63/1433 |

OTHER PUBLICATIONS

Usama Muhammad, "Unsupervised Machine Learning for Networking: Techniques, Applications and Research Challenges" IEEE Access vol. 7, 2018 pp. 65579-65615 (Year: 2018).*

Farsole et al., "Ethical Hacking," 2010 International Journal of Computer Applications, vol. 1, No. 10, 2010, pp. 14-20.

Al-Shiha et al., "Security Metrics for Ethical Hacking," Proceedings of the 2018 Computing Conference, vol. 2, 2018, pp. 1154-1165.

Li, "Penetration Testing Curriculum Development in Practice," Journal of Information Technology Education Innovations in Practice, vol. 14, 2015, pp. 85-99.

Denis et al., Penetration Testing: Concepts, Attack Methods, and Defense Strategies, 2016 IEEE Long Island Systems, Applications and Technology Conference (LISAT), 2016, pp. 1-6.

Le Blanc et al., "Investigating the Relationship between Need for Cognition and Skill in Ethical Hackers," 7th International Conference on Applied Human Factors and Ergonomics, Jul. 2016, pp. 223-228.

Abdou et al., "What Lies Beneath? Analyzing Automated SSH Bruteforce Attacks," International Conference on Passwords, 2015, pp. 72-91.

Salamatian et al., "Why Botnets Work: Distributed Brute-Force Attacks Need No Synchronization" IEEE Transactions on Information Forensics and Security, vol. 14, No. 9, Sep. 2019, pp. 2288-2299.

Aswani et al., "Topic Modeling of SSH Logs Using Latent Dirichlet Allocation for the Application in Cyber Security," IEEE Systems and Information Engineering Design Symposium, 2015, pp. 75-79.

Lee et al., "Heavy-Tailed Distribution of the SSH Brute-Force Attack Duration in a Multi-user Environment," Journal of the Korean Physical Society, vol. 69, No. 2, Jul. 2016, pp. 253-258.

* cited by examiner

INTRUSION MANAGEMENT WITH THREAT TYPE CLUSTERING

BACKGROUND

1. Field

The disclosure relates generally to computer security and, more specifically, to a method, apparatus, system, and computer program product for intrusion detection for a computer system.

2. Description of the Related Art

Attacks on computers and networks can occur with an attacker attempting to gain access to a computer or a network through submitting user IDs and passwords or passphrases. For example, the attacker may submit many user IDs and passwords or passphrases in the hope of eventually getting a correct combination. This type of attack can be a brute force attack in which the attacker systematically checks all user IDs and passwords and passphrases until a correct combination is found.

Although defending against these and other cyber security threats is important, it can be costly to an organization. Defending against attacks can often be given a lower priority. This lower priority can be based on the low likelihood of a successful attack and the capacity of an information technology department to set up and manage defenses.

Attackers use these tactics because of the cost-effectiveness of these attacks. Current systems typically have pre-defined thresholds for failed login attempts and will lockout a particular IP address when the threshold has been exceeded.

SUMMARY

According to one embodiment of the present invention, a method for threat management collects, by a computer system, a set of features used by a machine learning model to determine a threat type for an access attempt when the access attempt is detected. A cluster is determined, by the machine learning model in the computer system, for the access attempt using the set of features, wherein the machine learning model implements clustering to determine the cluster for the access attempt, and wherein the cluster for the access attempt corresponds to the threat type for the access attempt. A set of actions is performed, by the machine learning model in the computer system, based on the threat type determined for the access attempt.

According to another embodiment of the present invention, a threat management system collects a set of features used by a machine learning model to determine a threat type for an access attempt on the computer system when the access attempt is detected. The computer system determines, by the machine learning model in the computer system, a cluster using the set of features. The machine learning model implements clustering to determine the cluster for the access attempt, wherein the cluster for the access attempt corresponds to the threat type for the access attempt using the set of features, and performs a set of actions based on the threat type determined for the access attempt.

According to yet another embodiment of the present invention, a computer program product for threat management comprises a computer-readable-storage media with first program code, second program code, and third program code stored on the computer-readable storage media. The first program code is executable by a computer system to cause the computer system to collect a set of features used by a machine learning model to determine a threat type for an access attempt on the computer system when the access attempt is detected. The second program code is executable by the computer system to cause the computer system to determine, by the machine learning model in the computer system, a cluster for the access attempt using the set of features. The machine learning model implements clustering to determine the cluster for the access attempt, wherein the cluster for the access attempt corresponds to the threat type for the access attempt using the set of features. The third program code is executable by the computer system to cause the computer system to perform a set of actions based on the threat type determined for the access attempt.

DETAILED DESCRIPTION

Figure 1:
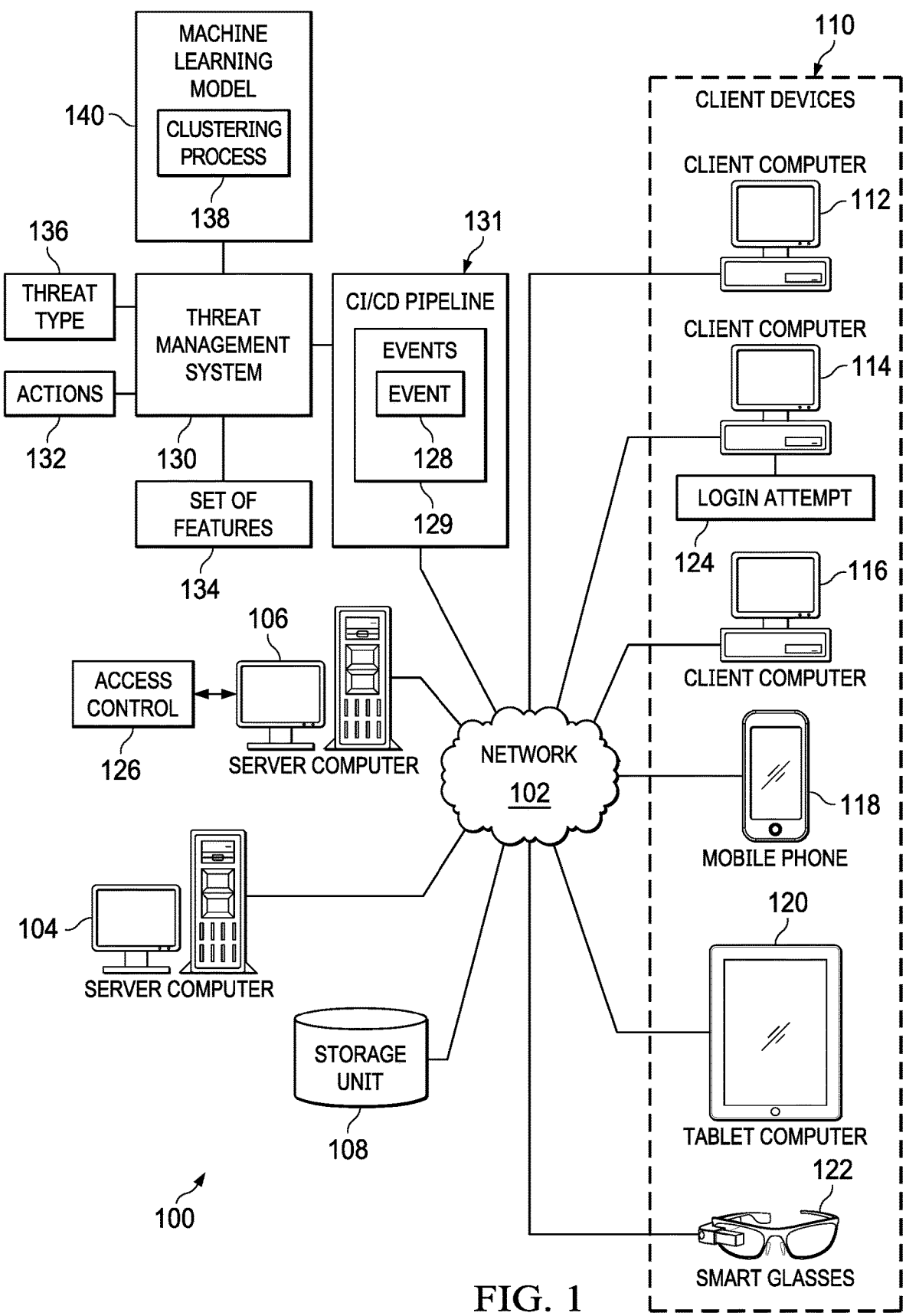
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different issues. For example, the illustrative embodiments recognize and take into account that current systems are rule-based using predefined thresholds for failed login attempts to determine the presence of a malicious attack. The illustrative embodiments recognize and take into account that the current approach is reactive in contrast to being predictive. The illustrative embodiments also recognize and take into account that the current rule-based systems are simple heuristic rules that may not be useful in a fast-changing and dynamic environment where bad actors work as a distributed team and create the appearance of randomness in their attacks, easily circumventing threshold approaches. Further, the illustrative embodiments recognize and take into account current techniques may not provide timely information about the nature of an attack to enable mitigating or preventing intrusion into the computer system.

The illustrative embodiments recognize and take into account that it would be desirable to have a threat management system that provides the user or network operator sufficient time to react to an attack. Further, the illustrative embodiments recognize and take into account that it is desirable to provide information about an attack or attacker to enable taking actions to counter the attack. The illustrative embodiments recognize and take into account that an action such as blocking an Internet protocol (IP) address is currently one solution for attacks. The illustrative embodiments recognize and take into account that false positives can be costly for legitimate users and that blocking an Internet protocol address does not prevent the attacker from continuing the attack using a different Internet protocol address.

Thus, the illustrative embodiments provide a method, apparatus, system, and computer program product to detect threats in a manner that enables predicting future attacks, minimizing the amount of processing power, time, and operational resources to identify attacks, determine a threat type, and perform actions based on the detected threat type. For example, a method for threat management can collect, by a computer system, a set of features used by a machine learning model to determine a severity type for an access attempt in the computer system when the attack is detected. The method can determine, by a machine learning model in the computer system, a cluster for the attack using the set of features and any other suitable features, wherein the machine learning model implements clustering to determine the cluster for the attack, and wherein the cluster for the attack corresponds to a severity type for the attack. This method can perform a set of actions based on the threat type determined for the attack. Additionally, in the illustrative example, a determination of the threat type can be made using the features collected for the attack As used herein, a "set of," when used with reference to items, means one or more items. For example, a "set of actions" is one or more actions.

In an illustrative example, the amount of data to collect for analysis can be optimized to provide at least one of a prediction of a future attack or determine a threat level of an access attempt. This data collected for analysis is also referred to as features. The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In one illustrative example, an access attempt, such as login attempt 124, to access network 102 can occur at client computer 114. In this example, network 102 can be at least one of a local area network, a wide area network, or some of suitable type of network. In this example, access control 126 in server computer 106 can handle login attempt 124. In this example, when one or more login attempts occur over a period of time, event 128 is generated. Event 128 can include information such as an Internet protocol (IP) address, a process identifier (ID), text entered for the login, a response, and other suitable information. In this illustrative example, event 128 can include one or more login attempts from the IP address made within a period of time. In this example, each process ID is associated with a login attempt. The process ID enables parsing through secure shell (SSH) log data for multiple IP addresses performing logins at the same time.

In this depicted example, event 128 for login attempt 124 is sent to threat management system 130. In this example, event 128 is one event in events 129 that can be sent in continuous integration and continuous delivery (CI/CD) pipeline 131 from access control 126 to threat management system 130 as events are generated from different access attempts made to network 102. Events 129 can be generated and sent in real-time in continuous integration and continuous delivery (CI/CD) pipeline 131.

In this illustrative example, real-time means that events are generating as quickly as possible without any intentional delay. For example, an attentional delay can be holding a number of events 129 until some threshold number of events is reached before sending the number of events 129 to threat management system 130.

In response to receiving event 128, threat management system 130 can process event 128 for login attempt 124 and determine a set of actions 132 to be taken. In processing login attempt 124, threat management system 130 can collect a set of features 134. Set of features 134 is information that can be used by clustering process 138 to determine threat type 136 for login attempt 124. In this illustrative example, set of features 134 can be preselected pieces of information that provide a desired level of performance in evaluating the access attempt. In this illustrative example, the desired level of performance can include at least one of speed, accuracy, resource use, or other performance factors.

As depicted, set of features 134 collected can be static or dynamic. In other words, set of features 134 can be selected for use by a particular threat detection algorithm, such as a machine learning model. In other illustrative examples, set of features 134 can change over time. For example, as the machine learning model undergoes further training, set of features 134 can change. As another example, set of features 134 can change depending on the circumstances such as whether login attempt 124 is from a new Internet protocol (IP) address or a previously analyzed Internet protocol (IP) address.

In this illustrative example, threat management system 130 determines threat type 136 for login attempt 124. This threat type can be determined by categorizing login attempt 124 using set of features 134 collected for login attempt 124 identified in event 128.

This categorization can be performed by threat management system 130 using clustering process 138 in machine learning model 140. In other words, clustering process 138 in machine learning model 140 can place login attempt 124 into a cluster using set of features 134 collected about login attempt 124. The cluster can be used to identify threat type 136.

Further, machine learning model 140 can also analyze other information in addition to the set of features. In other words, other features can be used to provide a desired level performance in addition to the set of features 134. This additional information may also increase the performance of machine learning model 140 in determining threat type 136.

Additionally, based on the determination of threat type 136 for login attempt 124, threat management system 130 can perform a set of actions 132. The set of actions 132 can take different forms. For example, if login attempt 124 is a login attempt for an Internet protocol (IP) address for a registered user of network 102, the set of actions can be to monitor additional login attempts to determine the nature of those attempts and whether those attempts are successful or not. In another illustrative example, if login attempt 124 is an attempt to access network 102 from an unknown Internet protocol (IP) address, other actions can be taken such as blocking the Internet protocol (IP) address, sending a notification, or other suitable actions. In this example, an unknown Internet protocol (IP) address is an Internet protocol (IP) address for which no previous data has been collected. In this illustrative example, the notification can be sent to a network administrator or other user and include information about the tactic that can be used to mitigate at least one of a current or future attack on network 102.

Thus, threat management system 130 in server computer 104 can collect set of features 134 and analyze those collected features to determine threat type 136. This determination made by threat management system 130 can be performed in a manner that avoids or reduces the use of rule-based threat determinations that employ predefined thresholds for failed login attempts to determine in real-time when a malicious attack occurs. In other words, threat management system 130 can provide a dynamic approach to analyze access attempts through the use of machine learning model 140 rather than a reactive approach implemented in currently used rule-based techniques.

Further, threat management system 130 can provide superior performance compared to rule-based techniques when the environment in network 102 is dynamic and fast-changing. As a result, threat management system 130 can provide network administrators and other users of network 102 timely information about an attack as well as information needed to handle the attack.

Figure 2:
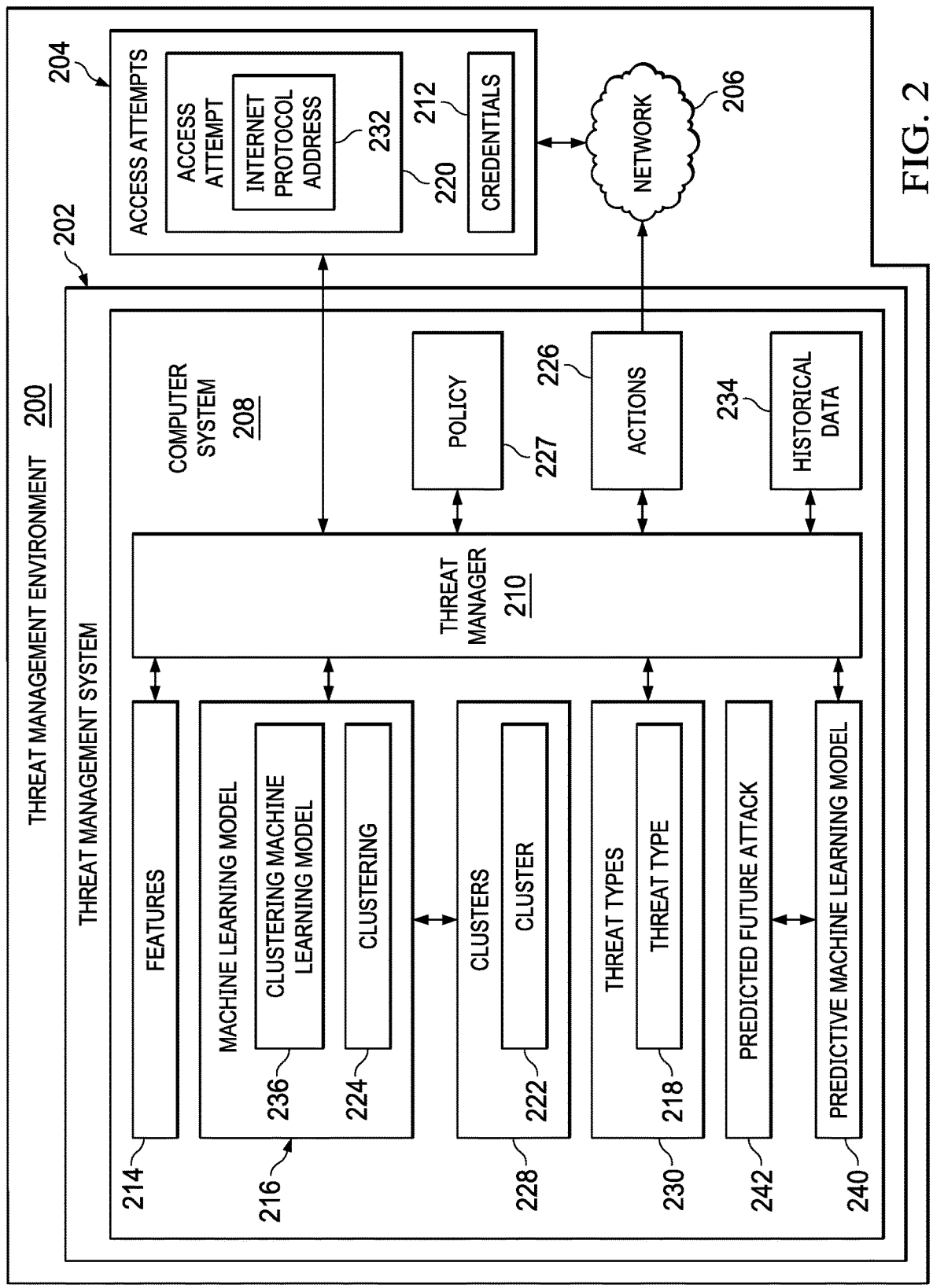
FIG. 2 is a block diagram of a threat management environment in accordance with an illustrative embodiment.

With reference now to FIG. 2, a block diagram of a threat management environment is depicted in accordance with an illustrative embodiment. In this illustrative example, threat management environment 200 includes components that can be implemented in hardware such as the hardware shown in network data processing system 100 in FIG. 1.

In this illustrative example, threat management environment 200 includes threat management system 202. As depicted, threat management system 202 can operate to provide at least one of detection, monitoring, or defending against threats. For example, threat management system 202 can operate to analyze access attempts 204 made to network 206. In this illustrative example, network 206 is an example implementation of network 102 in FIG. 1. Network 206 can take a number of different forms. For example, network 206 can be implemented using a number of different types of networks. For example, network 206 can be comprised of at least one of the Internet, an intranet, a local area network (LAN), a metropolitan area network (MAN), a wide area network (WAN), or other suitable networks.

Threat management system 202 comprises a number of different components. As depicted, threat management system 202 comprises computer system 208 and threat manager 210. In this illustrative example, threat manager 210 is located in computer system 208.

Threat manager 210 can be implemented in software, hardware, firmware, or a combination thereof. When software is used, the operations performed by threat manager 210 can be implemented in program code configured to run on hardware, such as a processor unit. When firmware is used, the operations performed by threat manager 210 can be implemented in program code and data and stored in persistent memory to run on a processor unit. When hardware is employed, the hardware may include circuits that operate to perform the operations in threat manager 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

In this illustrative example, threat manager 210 in computer system 208 can process access attempts 204 detected for network 206. Access attempts 204 can be an attempt to gain access to network 206 by presenting credentials 212. Credentials 212 can include at least one of a username and password, a fingerprint, a hand geometry, an iris pattern, a retina pattern, an electronic key, a smartcard, a radio frequency identifier, a token, or other suitable means for authenticating a user or other entity to access network 206.

As depicted, threat manager 210 can collect a set of features 214 used by machine learning model 216 to determine threat type 218 for access attempt 220 in access attempts 204 when access attempt 220 is detected. In this illustrative example, threat manager 210 can determine, using machine learning model 216 in computer system 208, cluster 222 for access attempt 220 using a set of features 214. In this illustrative example, machine learning model 216 implements clustering 224 to determine cluster 222 for access attempt 220. Cluster 222 for access attempt 220 corresponds to threat type 218 for access attempt 220. Threat manager 210 can perform a set of actions 226 based on threat type 218 determined for access attempt 220.

In this illustrative example, a feature is a piece of information that can be used for analyzing access attempt 220 to determine threat type 218. As depicted, the set of features 214 can take a number of different forms. For example, the set of features 214 can be selected from at least one of a number of directly identifiable features identified in login information, a derived feature derived from a number of directly identifiable features, a derived feature derived from a set of historical features, a derived feature derived from a number of directly identifiable features and the set of historical features, a predicted future attack, a timestamp for a login attempt, an Internet protocol (IP) address, an event ratio of a number of login attempts occurring during a time window, a number of Internet protocol (IP) addresses in a network, historical information for the Internet protocol (IP) address of the access attempt, information about a registered user of an Internet resource, a number of systems being attacked, a username, a password, a count of error messages, events per Internet protocol (IP) address, events per Internet protocol (IP) address, or a duration of an attack.

In this illustrative example, the set of actions 226 can be determined using policy 227. Policy 227 is a set of rules and can include data used to apply the set of rules. The set of actions 226 can be determined using a rule best mechanism. In other illustrative examples, machine learning model can also be employed to determine the set of actions 226.

The set of actions 226 also can take a number of different forms. For example, the set of actions 226 can be selected from at least one of sending a notification, sending an email message, sending a text message, blocking a set of Internet protocol (IP) addresses, isolating a network device, closing a port, deploying a honeypot, or other suitable actions for responding to threat type 218 determined for access attempt 220.

In this illustrative example, machine learning model 216 can be a type of artificial intelligence model that can learn without being explicitly programmed. Machine learning model 216 can learn based on training data input into machine learning model 216. As depicted, machine learning model 216 can learn using various types of machine learning algorithms. The machine learning algorithms include at least one of a supervised learning, and unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

As depicted, machine learning model 216 implements clustering 224. For example, machine learning model 216 can implement an expectation maximization clustering algorithm. With this type of clustering, machine learning model 216 can be trained using unsupervised learning. In this illustrative example, clustering 224 selected for machine learning model 216 can be based on implementing the clustering algorithm that can be used to determine clusters 228 for access attempts 204. Clustering such as exception maximization can be implemented to determine an optimal number of clusters. In other examples, other types of clustering algorithms can be used such as K-means clustering, mean-shift clustering, density-based spatial clustering, or other suitable algorithms. Further, training of machine learning model 216 can also include input from subject matter experts with respect to access attempts 204, attacks, and other cybersecurity topics.

In this illustrative example, cluster 222 is one cluster in clusters 228 that access attempt 220 can be placed in by machine learning model 216 depending on the set of features 214. Threat type 218 is a threat type in threat types 230. In this illustrative example, clusters 228 correspond to threat types 230. In one illustrative example, the correspondence between clusters 228 and threat types 230 can be one-to-one correspondence.

In another illustrative example, threat type 218 can include more than one cluster in clusters 228. In other words, two or more clusters in clusters 228 can correspond to or be assigned to threat type 218 in threat types 230.

A number of different threat types can be used for threat types 218 depending on the particular implementation. For example, three threat types can be selected such as novice, experienced, and professional.

In one illustrative example, the clustering can be based on a set of features 214 including an event ratio, a time period, a period of time since the last access attempt, and whether the access attempt is from a geography that is known for cyber attacks. The event ratio is a number of attempts within a given time window. The determined cluster can correspond to a particular threat type.

In this simplified example, a predicted event ratio of 10 in which the last access attempt occurred five days or more from an unknown geography without any concurrent or historic associated Internet protocol (IP) addresses also attacking the system can indicate a novice threat type. A predicted event ratio of 50 in which the last attempt occurred one day ago from a known geography can indicate a threat type of experienced. As another example, a predicted event ratio of 100 in which the last access attempt occurred several minutes ago from a known geography and with a comparatively large number of other associated Internet protocol (IP) addresses both concurrently and historically attacking the system can be a threat type of professional. In practice, many more optimal events can be processed by machine learning model 216 to determine cluster 222.

In another example, five threat types can be used such as tier 1, tier 2, tier 3, tier 4, and tier 5. In this example, tier 1 is the lowest threat level and tier 5 is the highest threat level. In yet another illustrative example, threat types 218 may not indicate a level for a severity of a threat posed by access attempt 220. Instead, threat types 218 can identify a particular type of attack or category of attack identified for access attempt 220.

For example, threat types 230 can include a dictionary attack, a brute force, or some other type of attack. A dictionary attack can indicate that a list or database of common words and phrases are used in login attempts for access attempt 220. A brute force can indicate that likely and random character sets are generated as part of an exhaustive key search attack for access attempt 220. Further, threat types 230 can also indicate when a threat or attack is nonexistent.

In this illustrative example, access attempt 220 can include multiple tries or logins performed as part of access attempt 220. In other words, access attempt 220 can be multiple tries or efforts to gain access occurring within a period of time. As another example, access attempt 220 can include, for example, login attempts occurring for the same process identifier (ID).

The set of features 214 collected by threat manager 210 can be static or change dynamically. For example, the set of features 214 can be static in which the set of features 214 is set for a particular machine learning model In the illustrative example, the set of features 214 can be selected to meet a desired performance for machine learning model 216 to determine cluster 222 for access attempt 220. For example, the set of features 214 can be selected to meet performance factors selected from at least one of speed of cluster determination, processing resource use, or other suitable performance factors. If a different machine learning model is selected, the set of features 214 can change based on features 214 that provide a desired level of performance for the machine learning model replacing machine learning model 216.

In another illustrative example, the set of features 214 can vary dynamically during the operation of threat manager 210. For example, the set of features 214 can be determined as the set of features 214 used by machine learning model 216 to determine cluster 222 for access attempt 220 using Internet protocol address 232 for access attempt 220 when access attempt 220 is detected.

For example, Internet protocol address 232 can be used to determine whether historical data 234 is present for Internet protocol address 232. Historical data 234 can be used to identify features 214. If Internet protocol address 232 is absent, then some of the set of features 214 may not be determined for collection. Further, if Internet protocol address 232 is registered for network 206, information about the person associated with Internet protocol address 232 can be analyzed to determine whether access attempt 220 warrants collecting more information in the form of features 214. Depending on information identified for Internet protocol address 232, less features may be collected for features 214. In another illustrative example, if Internet protocol address 232 is located in historical data 234 as having performed prior attacks, then a different set of features 214 may be collected as compared to when Internet protocol address 232 is for a registered user that has no history of performing attacks on network 206.

In yet another illustrative example, the set of features 214 can vary when the desired performance in processing access attempts 204 by machine learning model 216 changes. For example, the set of features 214 can be changed to increase speed, reduce processor usage, improve performance metrics, reduce operational burden for the end user, or other performance factors.

In another illustrative example, threat manager 210 can update the set of features 214. This update can occur with further training of machine learning model 216. This training can be performed as access attempts 204 process using machine learning model 216. In other was to examples, training can be performed periodically or when selected amounts of historical data 234 are present.

In one illustrative example, machine learning model 216 can be clustering machine learning model 236 that determines clusters 228. Another machine learning model in the form of predictive machine learning model 240 can be trained to predict predicted future attack 242. The prediction of predicted future attack 242 can be made by predictive machine learning model 240 using a number of the set of features 214. Additionally, other features not used in the set of features 214 can be used.

In this illustrative example, predicted future attack 242 can be a predicted attack from Internet protocol address 232 for access attempt 220. Predicted future attack 242 can also be a prediction of a future attack from one or more other Internet protocol addresses in addition to or in place of Internet protocol address 232. These additional Internet protocol addresses can be addresses within a block or network of Internet protocol address 232.

Further, predicted future attack 242 can be used as a feature in the set of features 214 for determining cluster 222 for access attempt 220. With predicted future attack 242 used as a feature, threat manager 210 can determine cluster 222. In yet another illustrative example, regardless of whether predicted future attack 242 is used as a feature, threat manager 210 can determine the set of actions 226 based on threat type 218 determined for access attempt 220 by clustering machine learning model 236. The set of actions 226 can also be based on predicted future attack 242. In other words, the set of actions 226 can be selected using both threat type 218 and predicted future attack 242. Predicted future attack 242 is information that can used in avoiding, countering, or managing future attacks on network 206. For example, predicted future attack 242 can be used to determine a location for deploying a honeypot.

In the illustrative example, the processing of access attempts 204 by threat manager 210 to determine the set of actions 226 to perform can be in real-time during the operation of computer system 208. In other words, the different steps performed by threat manager 210 can be performed as quickly as possible without any intentional delay. Further, the set of actions 226 can be stored in historical data 234 in addition to the results from the set of actions 226.

As depicted in the examples, one or more technical solutions are present that overcome a problem with managing threats posed by access attempts 204 using rule and threshold-based threat management processes that may not produce desired responsiveness to dynamically changing environments. As a result, one or more solutions can provide and enable using a feature-based analysis system that collects features for use in determining a threat type and initiating actions based on the threat type that is determined.

Computer system 208 can be configured to perform at least one of the steps, operations, or actions described in the different illustrative examples using software, hardware, firmware, or a combination thereof. As a result, computer system 208 operates as a special purpose computer system in which threat manager 210 in computer system 208 enables managing threats such as unauthorized access attempts that may occur in network 206. In particular, threat manager 210 transforms computer system 208 into a special purpose computer system as compared to currently available general computer systems that do not have threat manager 210.

In the illustrative example, the use of threat manager 210 in computer system 208 integrates processes into a practical application for threat management that increases the performance of computer system 208. For example, threat manager 210 enables computer system 208 to manage threats with at least one of improved speed, improved accuracy, or reduced resource use in determining threat types 230 for access attempts 204 that may occur in network 206 as compared to current systems that do not implement threat manager 210. In other words, threat manager 210 in computer system 208 is directed to a practical application of processes integrated into threat manager 210 in computer system 208 that collect a set of features 214 related to access attempt 220, determine threat type 218 for access attempt 220, and perform a set of actions 226 based on the determination of threat type 218 for access attempt 220.

Figure 3:
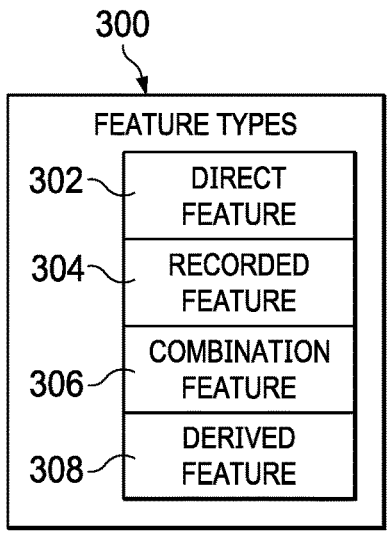
FIG. 3 is an illustration of types of features in accordance with an illustrative embodiment.

Turning next to FIG. 3, an illustration of types of features is depicted in accordance with an illustrative embodiment. In the illustrative examples, the same reference numeral may be used in more than one figure. This reuse of a reference numeral in different figures represents the same element in the different figures.

In this illustrative example, feature types 300 are examples of types of features that can be used to collect features 214 in FIG. 2. As depicted, feature types 300 include direct feature 302, stored feature 304, combination feature 306, and derived feature 308. These different types of features 214 can be used by machine learning model 216 to determine cluster 222 for access attempt 220 in which cluster 222 corresponds to threat type 218.

In this illustrative example, direct feature 302 is information relating to an access attempt. For example, direct feature 302 can be one of an Internet protocol (IP) address, a timestamp for the access attempt, credentials such as a username and password, or other information that can be directly obtained from information received about the access attempt. For example, direct feature 302 can be received in a data stream containing information about access attempts.

Each access attempt may be grouped or placed into an event for analysis. The event is a grouping of information relating to an access attempt such as an attempt to login that has failed. In the illustrative example, direct feature 302 does not require searching for information or calculating information. In this illustrative example, the window or period of time for an event for an access attempt can be selected in a number of different ways. For example, the period of time can be selected to increase the accuracy for machine learning model 216 to determine cluster 222. For example, the period of time can be one minute, five minutes, two hours, or some other period of time. The number of login attempts during this period of time form an event for an access attempt. In other words, an access attempt can have many login attempts that occur during the period of time. This grouping of data can also be used in retrieving features from historical data 234 in FIG. 2. For example, past failures over the selected period of time can be retrieved from historical data 234 for use in analyzing the current access attempt.

Recorded feature 304 is information stored in a data store. For example, recorded feature 304 can be information relating to an access attempt stored as historical data 234 in FIG. 2. As another example, recorded feature 304 can be registration information about users obtained from a service such as WhoIs. This registration information can include, for example, an organization, a city, a state, a latitude and longitude, a contact, a contact email address, or other registration information. Recorded feature 304 can also include stored information on other Internet protocol (IP) addresses that are part of the same network or Internet protocol (IP) address block as coordinated and concurrent attacks are common. As yet another example, recorded feature 304 can include, for example, past failure frequency, past credentials, or other information stored in historical data 234.

As depicted, combination feature 306 is information that is a combination of two or more of features 214 in FIG. 2. For example, combination feature 306 can be one of a geography and a timestamp of a login attempt, a geography and an event ratio, a timestamp and an event ratio, or other combinations of features. In this example, the event ratio is the number of logins within a period of time. In another illustrative example, combination feature 306 can be predicted future attack 242 in FIG. 2.

In this illustrative example, derived feature 308 is information that can be generated through calculations or processing of the set of features 214 in FIG. 2. For example, derived feature 308 can be a number of related Internet protocol (IP) addresses that have attacked the network, the time delta of the last record, a variance of the historical event ratio, the average inter-attack time period, a variance of inter-attack time periods, or a relative uniqueness of username and passwords attempted in comparison to historic data for attempts during a given time frame.

As another example, derived feature 308 can be predicted future attack 242 generated by predictive machine learning model 240 using a number of the set of features 214 in FIG. 2. In this illustrative example, predicted future attack 242 can be stored in historical data 234 along with information indicating whether predicted future attack 242 occurred as predicted. In this manner, predicted future attack 242 and prior predictions can be used in the set of features 214

The illustration of threat management environment 200 in FIGS. 2-3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, computer system 208 is shown as a separate component from network 206 in FIG. 2. In some illustrative examples, network 206 be located in computer system 208 or computer system 208 can be located in network 206. As another example, machine learning model 216 can use other features in addition to the set of features 214 in FIG. 2. In other words, although the set of features 214 can provide a desired level of performance, additional features not specified as part of the set of features 214 can be used. By including additional information, machine learning model 216 may perform with increased performance in addition to the desired level of performance in determining clusters 228 for access attempts 204 in FIG. 2.

Figure 4:
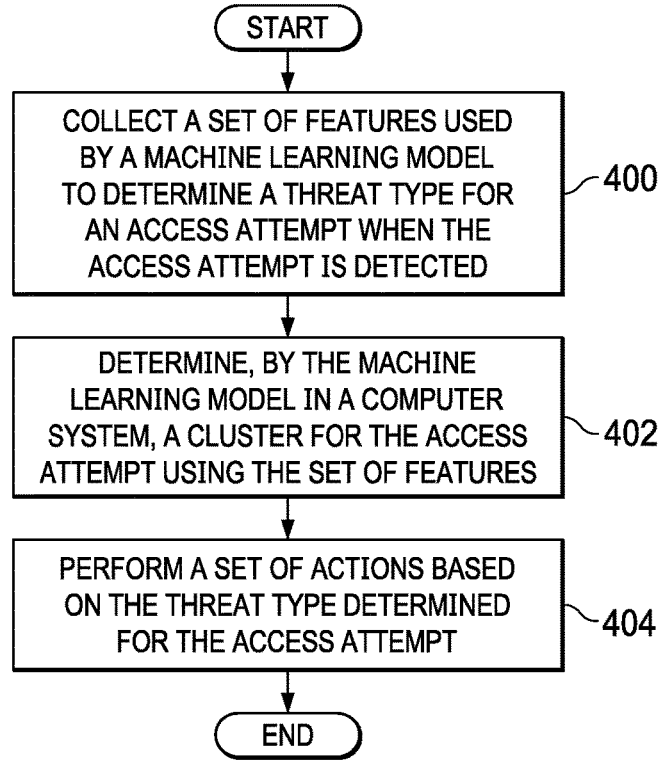
FIG. 4 is a flowchart of a process for threat management in accordance with an illustrative embodiment.

Turning next to FIG. 4, a flowchart of a process for threat management is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in threat manager 210 in computer system 208 in FIG. 2.

The process begins by collecting a set of features used by a machine learning model to determine a threat type for an access attempt when the access attempt is detected (step 400). The process determines, by the machine learning model in a computer system, a cluster for the access attempt using the set of features (step 402). In step 402, the machine learning model implements clustering to determine the cluster for the access attempt, wherein the cluster for the access attempt corresponds to the threat type for the access attempt.

The process performs a set of actions based on the threat type determined for the access attempt (step 404). The process terminates thereafter.

Figure 5:
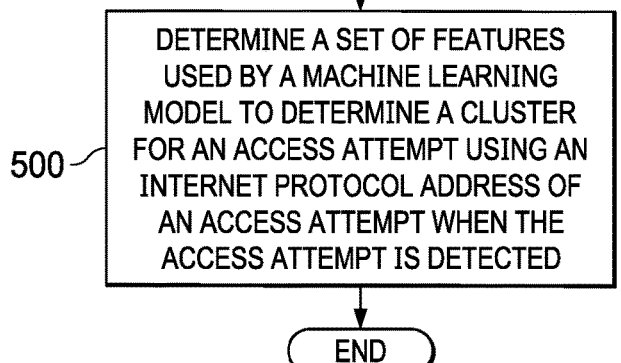
FIG. 5 is a flowchart of a process for determining a set of features in accordance with an illustrative embodiment.

With reference now to FIG. 5, a flowchart of a process for determining a set of features is depicted in accordance with an illustrative embodiment. The process in FIG. 5 is an example of an additional step that can be performed in the flowchart in FIG. 4.

The process determines a set of features used by a machine learning model to determine a cluster for an access attempt using an internet protocol address of the access attempt when the access attempt is detected (step 500). The process terminates thereafter.

Figure 6:
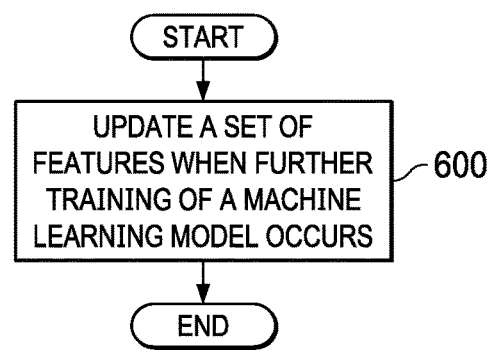
FIG. 6 is a flowchart of a process for updating a set of features in accordance with an illustrative embodiment.

Turning to FIG. 6, a flowchart of a process for updating a set of features is depicted in accordance with an illustrative embodiment. The process in FIG. 6 is an example of an additional step that can be performed in the flowchart in FIG. 5.

The process updates a set of features when further training of a machine learning model occurs (step 600). The process terminates thereafter.

Figure 7:
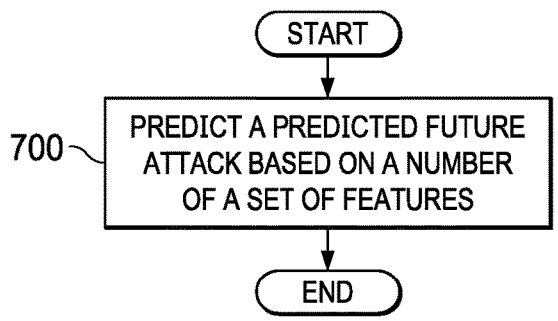
FIG. 7 is a flowchart of a process for predicting a future attack in accordance with an illustrative embodiment.

In FIG. 7, a flowchart of a process for predicting a future attack is depicted in accordance with an illustrative embodiment. The process in FIG. 7 is an example of an additional step that can be performed in the flowchart in FIG. 6.

The process predicts a predicted future attack based on a number of a set of features (step 700). The process terminates thereafter.

Figure 8:
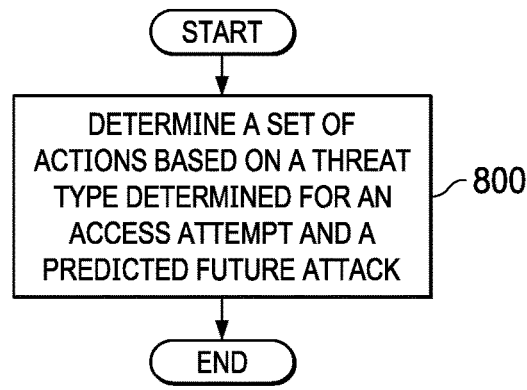
FIG. 8 is a flowchart of a process for determining a set of actions in accordance with an illustrative embodiment.

Turning now to FIG. 8, a flowchart of a process determining a set of actions is depicted in accordance with an illustrative embodiment. The process in FIG. 8 is an example of implementation of step 404 in FIG. 4 when a predicted future attack is predicted in the process in FIG. 7.

The process determines a set of actions based on a threat type determined for an access attempt and a predicted future attack (step 800). The process terminates thereafter.

Figure 9:
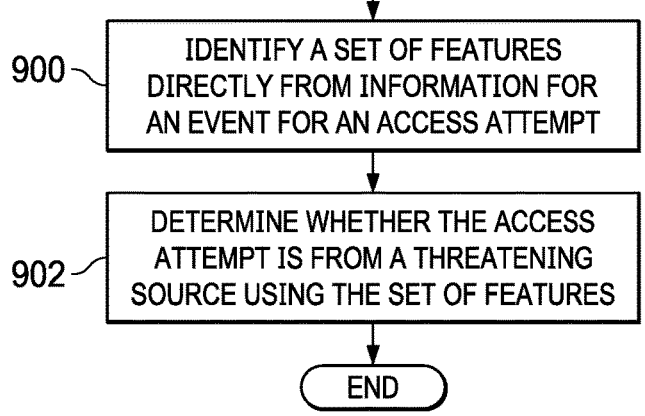
FIG. 9 is a flowchart of a process for initial processing of an access attempt in accordance with an illustrative embodiment.

With reference now to FIG. 9, a flowchart of a process for initial processing of an access attempt is depicted in accordance with an illustrative embodiment. The process in FIG. 9 is an example of additional steps that can be performed in the flowchart in FIG. 4.

The process begins by identifying a set of features directly from information for an event for an access attempt (step 900). The process determines whether the access attempt is from a threatening source using the set of features (step 902). The process terminates thereafter.

Figure 10:
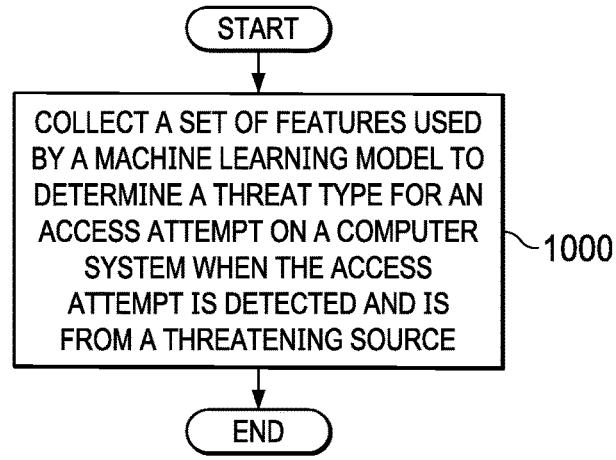
FIG. 10 is a flowchart of a process for collecting a set of features in accordance with an illustrative embodiment.

Turning to FIG. 10, a flowchart of a process for collecting a set of features is depicted in accordance with an illustrative embodiment. This flowchart illustrates an implementation of step 902 that can occur when a threatening source determination is made using the steps in FIG. 9.

The process collects a set of features used by a machine learning model to determine a threat type for an access attempt on a computer system when the access attempt is detected and is from a threatening source (step 1000). The process terminates thereafter. In this illustrative example, the collection of the set of features does not occur when the access attempt is not from a threatening source.

Figure 11:
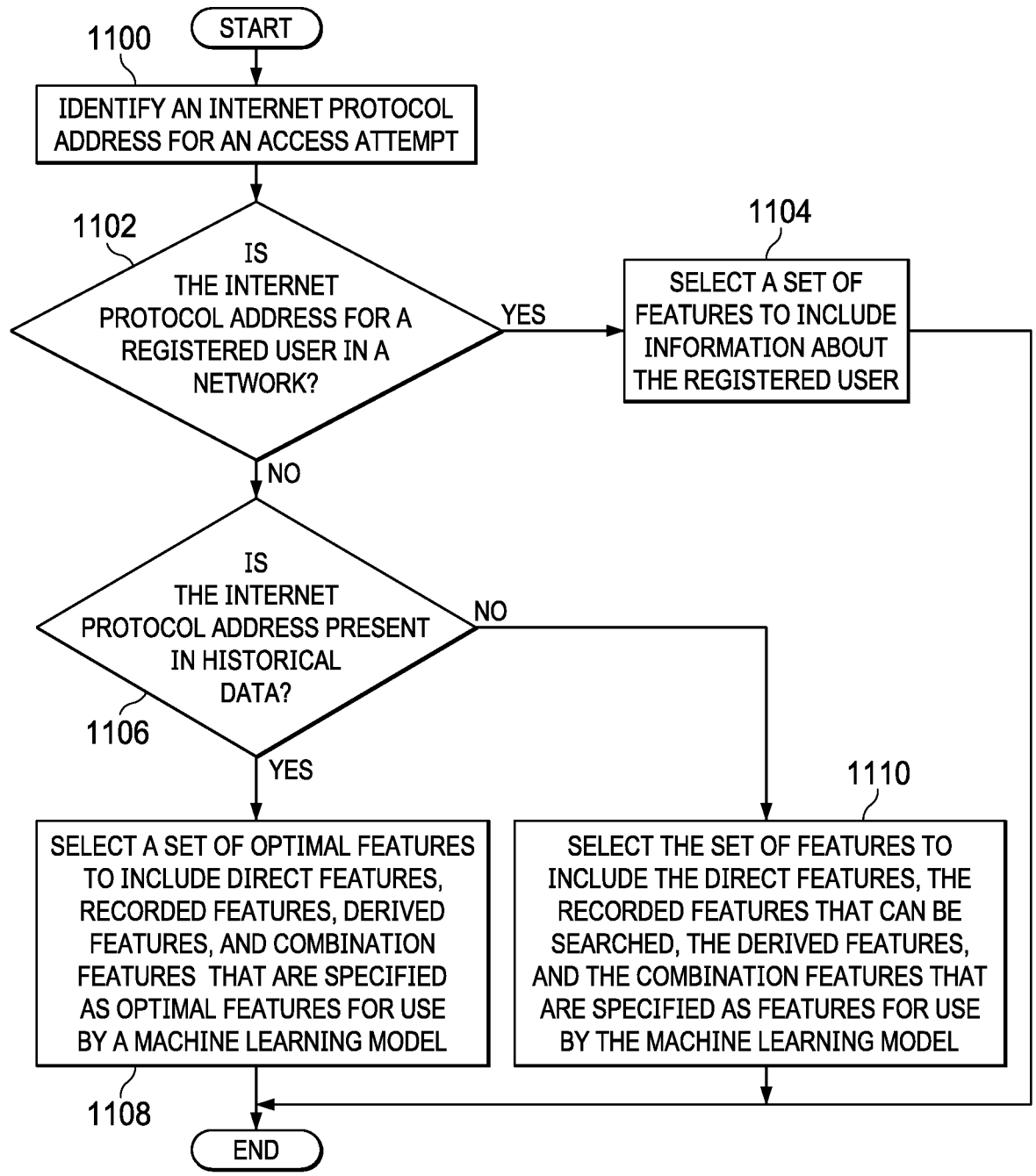
FIG. 11 is a flowchart of a process for determining a set of features to collect in accordance with an illustrative embodiment.

With reference now to FIG. 11, a flowchart of a process for determining a set of features to collect is depicted in accordance with an illustrative embodiment. The process illustrated in FIG. 11 is an example of one implementation for step 500 in FIG. 5.

The process begins by identifying an Internet protocol address for an access attempt (step 1100). The process determines whether the Internet protocol address is for a registered user in a network (step 1102). In step 1102, the Internet protocol address can be processed using a lightweight directory access protocol (LDAP) filter. This filter can determine whether the Internet protocol address in the access attempt is in a master file listing of Internet protocol addresses of all authorized users in the network.

If the Internet protocol address is for a registered user, a set of features can be selected to include information about the registered user (step 1104). This information can include a username, a position, a department, an organization, or other information about the user that can be obtained from the master file listing of authorized users. The process terminates thereafter.

With reference again to step 1102, if the Internet protocol address is not for a registered user in the network, the process can determine whether the Internet protocol address is present in historical data (step 1106). If the Internet protocol address is present in the historical data, the process can select the set of features to include direct features, recorded features, derived features, and combination features that are specified as features for use by a machine learning model (step 1108). The process terminates thereafter.

Turning back to step 1106, if the Internet protocol address is not present in the historical data, the process can select the set of features to include the direct features, the recorded features that can be searched, the derived features, and the combination features that are specified as the features for use by the machine learning model (step 1110). The process terminates thereafter.

As a result, the set of features can vary as the attempted access is processed. The machine learning model has the set of features from which a subset of these features can be selected based on the different determinations made. For example, if the Internet protocol (IP) address is not found in the historical data, then the set of features collected does not include recorded features that are in the historical data or the combination features that use the historical data.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
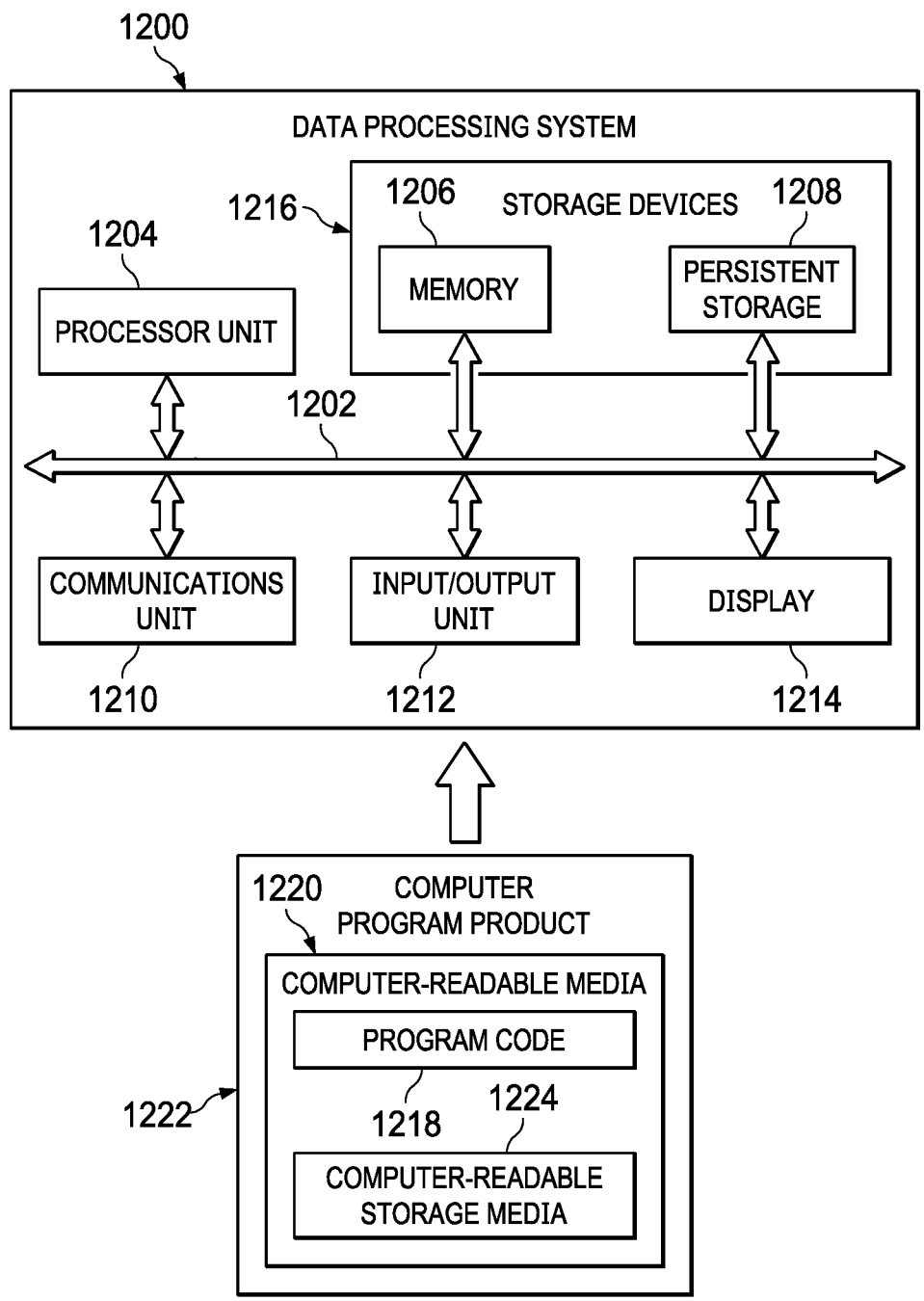
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, and client devices 110 in FIG. 1. Data processing system 1200 can also be used to implement computer system 208. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

Computer-readable storage media 1224 is a physical or tangible storage device used to store program code 1218 rather than a medium that propagates or transmits program code 1218. Computer-readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 can be transferred to data processing system 1200 using a computer-readable signal media. The computer-readable signal media are signals and can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Thus, illustrative embodiments provide a computer-implemented method, computer system, and computer program product for threat management. In one illustrative example, a set of features used by a machine learning model is collected by the computer system to determine a threat type for an access attempt when the access attempt is detected. A cluster is determined, by the machine learning model in the computer system, for the access attempt using the set of features, wherein the machine learning model implements clustering to determine the cluster for the access attempt, and wherein the cluster for the access attempt corresponds to the threat type for the access attempt. A set of actions is performed by the machine learning model in the computer system based on the threat type determined for the access attempt.

In one illustrative example, the threat management system employs a machine learning model with feature optimization. A set of optimized features can be selected based on performance desired from a particular machine learning model. Further, the set of optimized features can vary depending on the initial evaluation of the Internet protocol (IP) address. With the set of optimized features, the machine learning model can determine the cluster for a particular access attempt that corresponds to a threat type. The threat management system can perform actions for risk management in a manner that addresses different types of threats without a mechanical rule-based system. Further, the threat management system can determine appropriate actions based on the type of threat determined. In this illustrative example, this type of process can be performed on a real-time basis with the desired level of performance.

The desired level of performance can include performance factors such as speed, accuracy, resource use, or other factors. Further, in the illustrative example, if the desired level of performance changes, the set of optimized features can change to enable the machine learning model and the threat management system to perform with the new desirable performance.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for threat management, the method comprising:
   collecting, by a computer system, a set of features used by a machine learning model to determine a threat type for an access attempt when the access attempt is detected, wherein the machine learning model can be trained using unsupervised learning;
   determining, by the machine learning model in the computer system, a cluster for the access attempt using the set of features, wherein the machine learning model implements an expectation clustering maximization algorithm to determine the cluster for the access attempt, and wherein the cluster for the access attempt corresponds to the threat type for the access attempt;

performing, by the computer system, a set of actions based on the threat type determined for the access attempt;

predicting, by the computer system, a predicted future attack based on a number of the set of features, wherein the predicted future attack comprises another access attempt from a protocol address;

identifying the set of features directly from information for the access attempt; and determining whether the access attempt is from a threatening source using the set of features; and wherein collecting, by the computer system, the set of features used by the machine learning model to determine the threat type for the access attempt when the access attempt is detected comprises:

collecting, by the computer system, the set of features used by the machine collecting, by the computer system, the set of features used by the machine learning model to determine the threat type for the access attempt on the computer system when the access attempt is detected and is from the threatening source, wherein the access attempt on the computer system is one event in a plurality of events generated and sent in a continuous integration and continuous delivery pipeline from an access control to a threat management system of the computer system as the plurality of events are generated from different access attempts in real-time, wherein the access control is located in a server computer that handles the access attempt.

2. The method of claim 1 further comprising:
determining, by the computer system, the set of features used by the machine learning model to determine the cluster for the access attempt using an internet protocol address of the access attempt when the access attempt is detected.

3. The method of claim 1 further comprising:
updating the set of features when further training of the machine learning model occurs.

4. The method of claim 1, wherein performing the set of actions based on the threat type determined for the access attempt comprises:
determining the set of actions based on the threat type determined for the access attempt and the predicted future attack.

5. The method of claim 1, further comprising implementing the expectation clustering maximization algorithm to determine an optimal number of clusters.

6. The method of claim 1, wherein the set of actions is selected from at least one of sending a notification, sending an email message, sending a text message, blocking a set of IP addresses, isolating a network device, closing a port, or deploying a honeypot.

7. The method of claim 1, wherein the set of features is selected from at least one of a number of directly identifiable features identified in login information, a derived feature derived from a number of directly identifiable features, the derived feature derived from a set of historical features, the derived feature derived from the number of directly identifiable features and the set of historical features, a predicted future attack, a timestamp for a login attempt, an IP address, a process ID, an event ratio of a number of login attempts occurring during a time window, a number of IP addresses in a network, historical information for the IP address of the access attempt, information about a registered user of an Internet resource, a number of systems being attacked, a username, a password, a count of error messages, events per Internet protocol (IP) address, or a duration of an attack.

8. An apparatus comprising:
a computer hardware system that collects a set of features used by a machine learning model to determine a threat type for an access attempt on the computer hardware system when the access attempt is detected, wherein the machine learning model can be trained using unsupervised learning, wherein the computer hardware system determines, by the machine learning model in the computer hardware system, a cluster using the set of features, wherein the machine learning model implements an expectation clustering maximization algorithm to determine the cluster for the access attempt, wherein the cluster for the access attempt corresponds to the threat type for the access attempt using the set of features; and performs a set of actions based on the threat type determined for the access attempt, wherein the computer hardware system predicts a predicted future attack based on a number of the set of features, wherein the predicted future attack comprises another access attempt from a protocol address, wherein the computer hardware system:
identifies the set of features directly from information for the access attempt; and determines whether the access attempt is from a threatening source using the set of features, wherein in collecting, by the computer hardware system, the set of features used by the machine learning model to determine the threat type for the access attempt when the access attempt is detected, the computer hardware system collects the set of features used by the machine learning model to determine the threat type for the access attempt on the computer hardware system when the access attempt is detected and is from the threatening source, wherein the access attempt on the computer hardware system is one event in a plurality of events generated and sent in a continuous integration and continuous delivery pipeline from an access control to a threat management system of the computer hardware system as the plurality of events are generated from different access attempts in real-time, and wherein the access control is located in a server computer that handles the access attempt.

9. The apparatus of claim 8, wherein the computer hardware system determines the set of features used by the machine learning model to determine the cluster for the access attempt using an Internet protocol address of the access attempt when the access attempt is detected.

10. The apparatus of claim 8, wherein the computer hardware system updates the set of features when further training of machine learning model occurs.

11. The apparatus of claim 8, wherein in performing the set of actions based on the threat type determined for the access attempt, the computer hardware system determines the set of actions based on the threat type determined for the access attempt and the predicted future attack.

12. The apparatus of claim 8, wherein the computer hardware system implements the expectation clustering maximization algorithm to determine an optimal number of clusters.

13. The apparatus of claim 8, wherein the set of actions is selected from at least one of sending a notification, sending an email message, sending a text message, blocking a set of IP addresses, isolating a network device, closing a port, or deploying a honeypot.

14. The apparatus of claim 8, wherein the set of features is selected from at least one of a number of directly identifiable features identified in login information, a derived feature derived from a number of directly identifiable features, the derived feature derived from a set of historical features, the derived feature derived from the number of directly identifiable features and the set of historical features, a predicted future attack, a timestamp for a login attempt, an IP address, a process ID, an event ratio of a number of login attempts occurring during a time window, a number of IP addresses in a network, historical information for the IP address of the access attempt, information about a registered user of an Internet resource, a number of systems being attacked, a username, a password, a count of error messages, events per Internet protocol (IP) address, or a duration of an attack.

15. A computer program product for threat management, the computer program product comprising:
a computer-readable storage media;
first program code, stored on the computer-readable storage media, executable by a computer system to cause the computer system to collect a set of features used by a machine learning model to determine a threat type for an access attempt on the computer system when the access attempt is detected, wherein the machine learning model can be trained using unsupervised learning;
second program code, stored on the computer-readable storage media, executable by the computer system to cause the computer system to determine, by the machine learning model in the computer system, a cluster for the access attempt using the set of features, wherein the machine learning model implements an expectation clustering maximization algorithm to determine the cluster for the access attempt and wherein the cluster for the access attempt corresponds to the threat type for the access attempt using the set of features;
third program code, stored on the computer-readable storage media, executable by the computer system to cause the computer system to perform a set of actions based on the threat type determined for the access attempt;
fourth program code, stored on the computer-readable storage media, executable by the computer system to cause the computer system to predict a predicted future attack based on a number of the set of features, wherein the predicted future attack comprises another access attempt from a protocol address; and
program code, stored on the computer-readable storage media, executable by the program code, stored on the computer-readable storage media, executable by the computer system to cause the computer system to:
identify the set of features directly from information for the access attempt; and
determine whether the access attempt is from a threatening source using the set of features,
wherein to collect, by the computer system, the set of features used by the machine learning model to determine the threat type for the access attempt when the access attempt is detected comprises:
to collect, by the computer system, the set of features used by the machine learning model to determine the threat type for the access attempt on the computer system when the access attempt is detected and is from the threatening source,
wherein the access attempt on the computer system is one event in a plurality of events generated and sent in a continuous integration and continuous delivery pipeline from an access control to a threat management system of the computer system as the plurality of events are generated from different access attempts in real-time,
wherein the access control is located in a server computer that handles the access attempt.

16. The computer program product of claim 15, wherein the third program code comprises:
fifth program code, stored on the computer-readable storage media, executable by the computer system to cause the computer system to determine the set of actions based on the threat type determined for the access attempt and the predicted future attack.

17. The computer program product of claim 15, wherein the expectation clustering maximization algorithm determines an optimal number of clusters.

18. The computer program product of claim 15, wherein the set of actions is selected from at least one of sending a notification, sending an email message, sending a text message, blocking a set of IP addresses, isolating a network device, closing a port, or deploying a honeypot.

19. The computer program product of claim 15, wherein the set of features is selected from at least one of a number of directly identifiable features identified in login information, a derived feature derived from a number of directly identifiable features, the derived feature derived from a set of historical features, the derived feature derived from the number of directly identifiable features and the set of historical features, a predicted future attack, a timestamp for a login attempt, an IP address, a process ID, an event ratio of a number of login attempts occurring during a time window, a number of IP addresses in a network, historical information for the IP address of the access attempt, information about a registered user of an Internet resource, a number of systems being attacked, a username, a password, a count of error messages, events per Internet protocol (IP) address, or a duration of an attack.

20. The computer program product of claim 15, wherein the first program code causes the computer system to update the set of features when further training of the machine learning model occurs.

* * * * *